(12) United States Patent  
Takeyama et al.

(10) Patent No.: US 7,141,802 B2
(45) Date of Patent: Nov. 28, 2006

(54) OPTICAL DEVICE AND IMAGING METHOD

(75) Inventors: Tetsuhide Takeyama, Hachioji (JP); Masayuki Mizusawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/998,196

(22) Filed: Nov. 29, 2004

(65) Prior Publication Data

US 2005/0211874 A1   Sep. 29, 2005

(30) Foreign Application Priority Data

Dec. 1, 2003   (JP)  ............................. 2003-401429
Mar. 31, 2004   (JP)  ............................. 2004-101603

(51) Int. Cl.
*G01J 1/58* (2006.01)
*G01T 1/10* (2006.01)
(52) U.S. Cl. ................................. 250/458.1; 250/208.1
(58) Field of Classification Search ............. 250/458.1, 250/208.1, 459.1, 461.1, 461.2; 436/172; 422/82.08
See application file for complete search history.

(56) References Cited

U.S. PATENT DOCUMENTS

| 6,028,306 | A | * | 2/2000 | Hayashi | 250/235 |
| 6,040,940 | A | * | 3/2000 | Kawasaki | 359/389 |
| 6,091,911 | A | * | 7/2000 | Sakano et al. | 396/432 |
| 6,262,837 | B1 | * | 7/2001 | Nagano et al. | 359/368 |
| 6,555,802 | B1 | * | 4/2003 | Osipchuk et al. | 250/201.3 |
| 6,643,061 | B1 | * | 11/2003 | Osa et al. | 359/385 |
| 2002/0109101 | A1 | * | 8/2002 | Hoffmann | 250/458.1 |
| 2003/0058530 | A1 | * | 3/2003 | Kawano | 359/385 |
| 2004/0051051 | A1 | * | 3/2004 | Kato et al. | 250/458.1 |

FOREIGN PATENT DOCUMENTS

| JP | 03-209415 | 9/1991 |
| JP | 09-28105 | 10/1997 |
| JP | 10-028576 | 2/1998 |

\* cited by examiner

*Primary Examiner*—David Porta
*Assistant Examiner*—Mark R. Gaworecki
(74) *Attorney, Agent, or Firm*—Pillsbury Winthrop Shaw Pittman, LLP

(57) ABSTRACT

An optical device includes a carrier that holds a specimen and has a reference mark, an image capturing means that picks up the image of the specimen and the reference mark formed by an objective lens, a moving mechanism that moves the relative positional relation between the carrier and the objective lens, divides the imaging region into a plurality of regions so that adjacent regions partially overlap each other to enable the image of the specimen and the reference mark in each region to be captured by the image capturing means, and an image processing section that composites images of the plurality of regions captured by the image capturing means so as to match the same reference marks appearing on the overlapping portions.

15 Claims, 9 Drawing Sheets

Scan direction

Scan direction

{ GFP excitation light of wavelength 489 nm
  GFP fluorescence light of wavelength 509 nm

OPTICAL DEVICE AND IMAGING METHOD

BACKGROUND OF THE INVENTION

1. Field of the Invention

The present invention relates to an optical device such as a microscope system and an imaging method that can correctly generate a single image without incongruity from a plurality of divided observed images.

Priority is claimed on Japanese Patent Application No. 2003-401429, filed Dec. 1, 2003, the content of which is incorporated herein by reference, and Japanese Patent Application No. 2004-101603, filed Mar. 31, 2004, the content of which is incorporated herein by reference.

2. Description of Related Art

Gene sequences of many living organisms, including humans, are now known due to recent advances in gene sequencing technology. In addition, the causal connections between gene products such as sequenced proteins and diseases are slowly beginning to be understood. Furthermore, various visualization methods and devices employing cells are beginning to be conceived for exhaustive and statistical analysis of proteins, genes, etc. In particular, to perform such analysis, it is necessary to obtain desired information while cultivating cells over a long period. Doing so requires an apparatus that allows incubation and observation of cells under a microscope.

One such apparatus is known that uses a transparent thermostatic incubator for microscopy (for example, see paragraphs 0004 to 0007 and FIGS. 1 to 4 of Japanese Unexamined Patent Application, First Publication No. H10-28576).

This transparent thermostatic incubator for microscopy (hereafter, simply referred to as an incubator) is constituted to allow the setting of various incubation conditions for cells. For this purpose, the incubator has a pair of transparent exothermic plates, a carbon dioxide supply port and a carbon dioxide exhaust port, and an evaporation dish. Here, the temperatures of the transparent exothermic plates can be controlled to predetermined values by a thermostat. The carbon dioxide supply port and exhaust port control the carbon dioxide gas concentration in the space. The evaporation dish maintains the humidity in the hermetically sealed container.

In observations using the incubator, the temperature, carbon dioxide gas concentration and humidity in the container can be controlled, thereby enabling observation during cell culturing. Specifically, changes in the cell incubation state over time can be observed, for example, from the lower side of the transparent exothermic plates by observation with an objective lens.

Another cell observation method is fluorescence imaging. In particular, the liposome method, gene gun method and microinjection method, etc., are methods of observing fluorescence in a living material.

With these methods, technology for observing dynamic changes in cells and the like in which genes have been introduced has made rapid strides. In recent years, with the striking progress of green fluorescent protein, techniques of continuous fluorescence observation under a microscope of temporal and spatial changes in the subject of observation are attracting attention. The aforementioned subject of observation includes various behavior of materials in organelles in living cells and proteins.

When employing such observation methods, the need arises for high-resolution and wide-field observation of fluorescence from a microarray. This microarray comprises a large number of spots, ranging from several hundred to several tens of thousands, on a plastic or glass dish, plate or slide glass. During observation, this microarray is disposed in the incubator.

When observing a specimen with a microscope, the field that can be observed at one time is primarily determined by the magnification of the objective lens. Therefore, the higher the magnification of the objective lens, the narrower the field of view, which restricts the observed field to only a small portion of the sample. Until now, for example, microscopic image outputting methods (for example, see page 3, upper right column, line 5, to page 6, upper left column, line 6, and FIGS. 1 to 4 of Japanese Unexamined Patent Application, First Publication No. H03-209415) and methods based on microscopic systems (for example, see sections 0015 to 0087, and FIGS. 1 to 13 of Japanese Unexamined Patent Application, First Publication No. H09-281405) have been known as methods for obtaining a high resolution and wide field microscopic image.

In these microscopic image outputting methods, scanning is performed by changing the relative positional relationship between the stage on which the specimen is mounted and the illumination, and partial images dividing the imaging region into a plurality of regions are recorded. Then, the partial images are composited so as to be tiled to produce an image of the entire specimen.

Methods based on microscope systems are methods of reconstructing an entire image of a specimen by image compositing. First, the entire specimen is divided into small regions so as to have a plurality of mutually overlapping portions. Then, the image of each small region is captured with a microscope, and detection of positional deviations is performed by comparing the overlapping portions of each captured image. The images are then composited after correcting the position of the image of each small region based on these positional deviations. In this way, a wide-field high-definition image of the specimen is produced.

SUMMARY OF THE INVENTION

The optical device of the present invention is provided with a carrier for holding a specimen, the carrier having a reference mark, an image capturing means for capturing an image of the specimen and the reference mark formed by an objective lens, a moving mechanism for altering the relative positional relationship between the carrier and the objective lens and dividing the imaging region into a plurality of regions so that adjacent regions partially overlap each other, thereby enabling the image of the specimen and the reference mark in each region to be captured by the image capturing means, and an image processing section that composites images of the plurality of regions captured by the image capturing means so as to match the same reference marks appearing on the overlapping portions.

The carrier has two-dimensionally arrayed specimen incubation portions and separator portions provided between the adjacent specimen incubation portions. The reference marks may form boundary lines with the separator portions.

The carrier is arranged in an incubator which is maintained at the predetermined incubation conditions. The image processing section may detect the boundary line between the specimen incubation portions and separator portions utilizing self-fluorescence from the regions of the specimen incubation portions.

The optical device is provided with a light source, an illumination optical system that guides light emitted from the light source to the objective lens, an excitation filter, arranged between the illumination optical system and the objective lens, that transmits light of a predetermined wavelength among the light emitted from the illumination optical system, and a dichroic mirror that reflects the light transmitted by the excitation filter. The image capturing means may be provided with an excitation light cut filter that cuts light of a predetermined wavelength from the returning light from the carrier, an imaging lens that focuses the light transmitted through the excitation light cut filter, and an imaging element arranged in the imaging position of the imaging lens.

The excitation filter simultaneously transmits excitation light of a fluorescence material in the sample and fluorescence light emitted by the fluorescence material. It may be provided with an intensity changing means for changing the intensity of the fluorescence light.

The dichroic mirror may be set so as to reflect excitation light of the fluorescence material in the sample and the fluorescence light emitted by the fluorescence material.

Reflectance Rd of the dichroic mirror for the fluorescence light may be set to 1%<Rd<10%.

The separator portions may be mirror coated so as to reflect light of the same wavelength as the fluorescence light emitted by the fluorescence material of the sample.

Reflectance Re of the mirror coating may be set to 1%<Re<20%.

The device has a function to capture the image of a region by scanning in one direction of the carrier and repeat successive image capture in another direction perpendicular to the first direction, and the reference mark may be imprinted on the carrier in the said other direction.

A dark field illumination means may be provided that emits light of an equivalent wavelength as fluorescence emitted by the sample onto the reference mark.

The dark field illumination means may be a transmission type arranged on the opposite side of the image capturing means to sandwich the carrier.

The dark field illumination means may be a vertical illumination type arranged on the same side as the image capturing means with respect to the carrier.

The imaging method of the present invention obtains the captured image of a sample held on a carrier. It comprises an irradiation step that irradiates light emitted from the light source to the carrier that holds a sample and has a reference mark, an image capture step that divides the imaging region into a plurality of regions so that adjacent regions partially overlap each other and captures an image of the sample and the reference mark in each region, and an imaging step that composites captured images of the plurality of regions so as to match the same reference mark appearing on the overlapping portion.

DETAILED DESCRIPTION OF THE INVENTION

The first embodiment of the optical device according to the present invention is explained below with reference to FIGS. 1 to 3.

Figure 1:
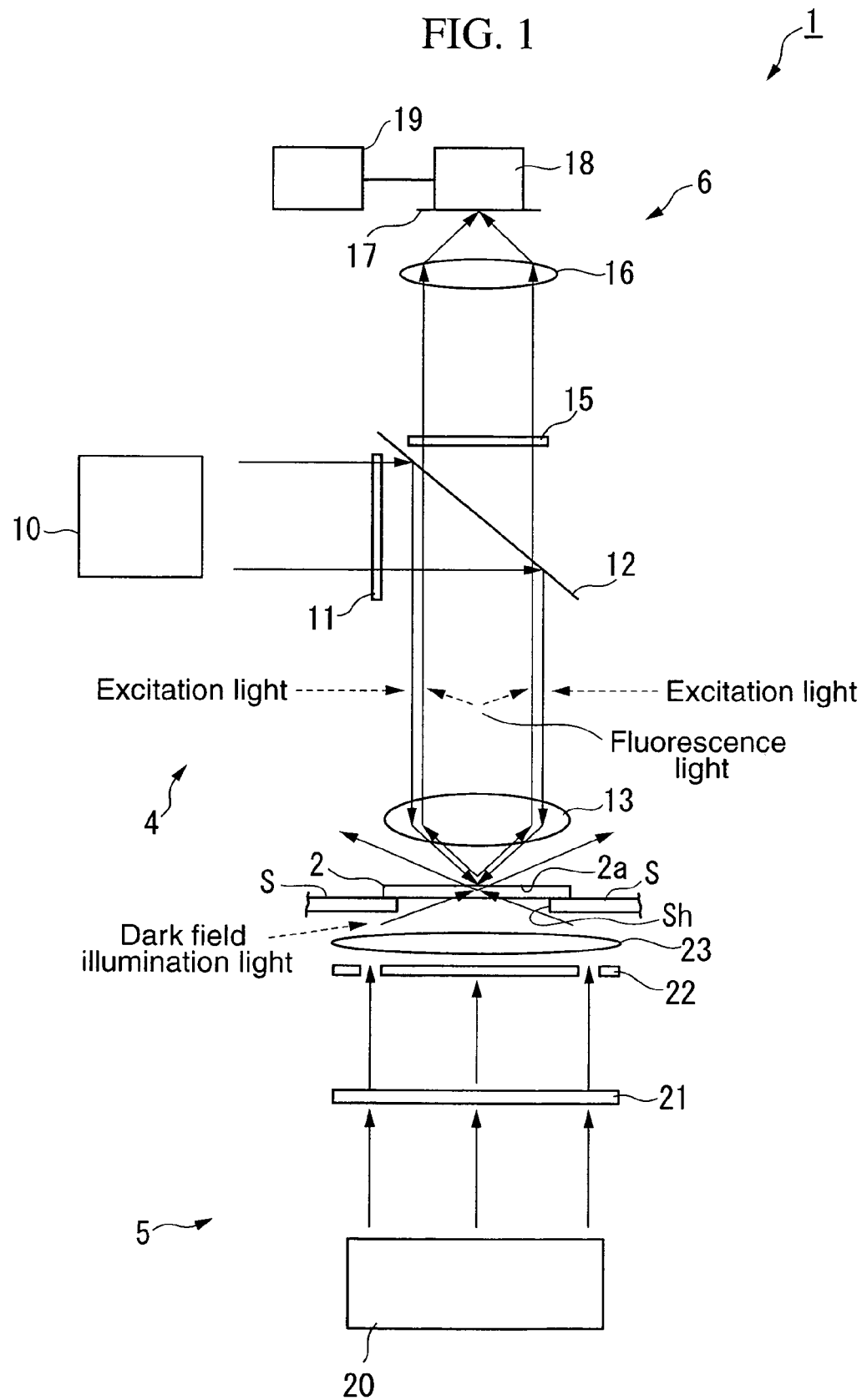
FIG. 1 is a block diagram showing the first embodiment of the optical device according to the present invention.
Figure 2:
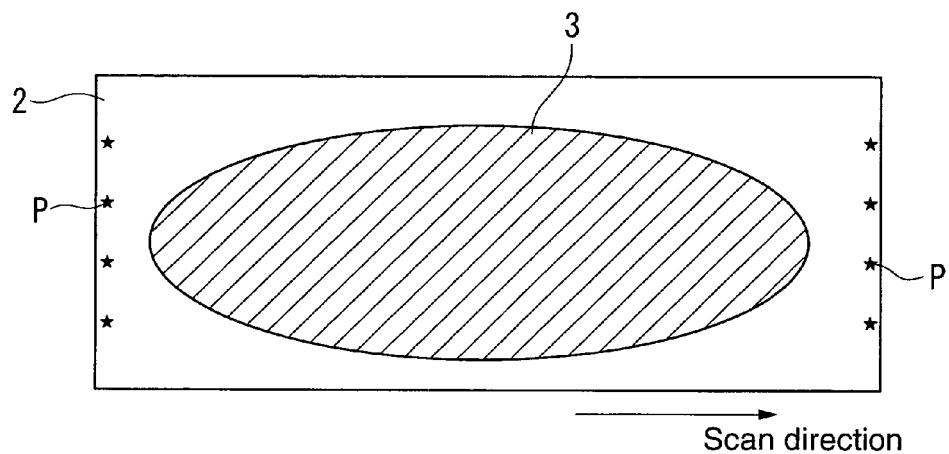
FIG. 2 is a top view of the slide glass showing an example of a pattern and a simple observation object whose image is captured by the optical device shown in FIG. 1.
Figure 3:
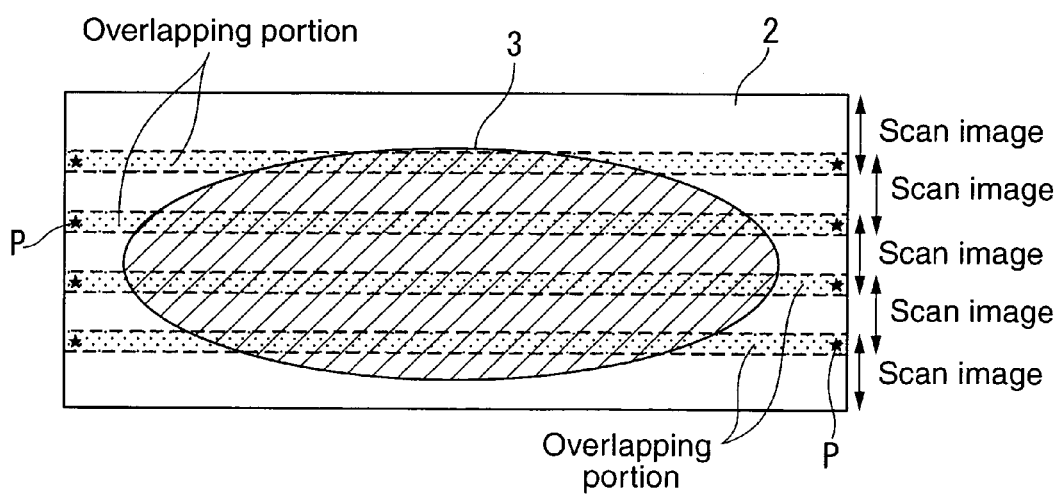
FIG. 3 is a diagram showing the state of scanning the slide glass shown in FIG. 2.

Optical device 1 of the present embodiment is a fluorescence microscope that, as show in FIGS. 1 and 2, is provided with an excitation light irradiation means 4, a dark field illumination means 5, an image capturing means 6 and an image processing section 19. Here, the excitation light irradiation means 4 irradiates excitation light onto the observation object (sample) 3 held in the slide glass (carrier) 2. The dark field illumination means 5 irradiates light of a predetermined wavelength on a reference pattern (mark) P imprinted on the slide glass 2. This light of a required wavelength is light of a wavelength equivalent to the fluorescence emitted by the observation object 3.

The image capturing means 6 captures the image of the observation object 3 and the pattern P. When capturing an image, the region to be captured is divided into a plurality of regions and each region is captured in turn. Image capture is performed so that adjacent regions partially overlap each other. The image capturing means 6 picks up the fluorescence image (sample image) in each region and the image of the light scattering on the pattern P. Image processing section 19 composites captured images of the plurality of regions so as to match the same patterns appearing on the overlapping portions.

FIG. 2 shows the slide glass 2. FIG. 2 shows the appearance of the slide glass 2 when viewed from above. The slide glass 2 is a plate-like body formed in a rectangular shape. The pattern P is imprinted in a plurality on the slide glass 2. This pattern P is for example star-shaped as shown in FIG. 2. Also, pattern P is imprinted perpendicular to the lengthwise direction, that is, along the short side direction. The pattern P is imprinted on the ends of the slide glass 2 at a predetermined interval. When doing so, the interval of adjacent pattern Ps is set to be slightly shorter than the scan width of image capturing element 18, to be described later, of the aforementioned image capturing means 6.

The observation object 3 consists of, for example, cells and the like and includes fluorescence matter that emits fluorescence when exposed to excitation light.

The slide glass 2 is mounted on stage S that has opening Sh and can be moved in a two-dimensional direction (horizontal direction). This stage S functions as a movement mechanism that changes the relative positional relation between the objective lens to be described and the slide glass 2.

The excitation light irradiation means 4, as shown in FIG. 1, has an optical system 10, an excitation filter 11, a dichroic mirror 12 and an objective lens 13. Here, the optical system 10 includes an excitation light source for fluorescence observation. The excitation filter 11 transmits light of the predetermined wavelength among the light emitted from the optical system 10. The dichroic mirror 12 reflects the light transmitted through the excitation filter 11. The objective lens 13 projects light reflected by the dichroic mirror 12 onto the observation object 3.

In other words, the excitation filter 11 turns light emitted from the optical system 10 into light of a predetermined wavelength, that is, excitation light. After the excitation light is reflected by the dichroic mirror 12, it is irradiated onto the specimen surface 2a (top surface) of the slide glass 2 by the objective lens 13.

In addition to having the function of reflecting excitation light, the dichroic mirror 12 has the function of transmitting fluorescence and light of an equivalent wavelength as fluorescence.

The image capturing means 6 has an excitation light cut filter 15, an imaging lens 16, and an image capturing element 18. The excitation light cut filter 15 cuts light of the predetermined wavelength from returning light from the slide glass 2, specifically, it cuts light other than of the fluorescence wavelength. The imaging lens 16 focuses the light transmitted through the excitation light cut filter 15 at a predetermined position. This predetermined position is the imaging surface (imaging position) 17 of the imaging lens 16. The image capturing element 18 is a CCD and the like arranged at the imaging surface 17 of the imaging lens 16. The excitation light cut filter 15 is arranged directly above the objective lens 13 and behind the dichroic mirror 12.

That is, the fluorescence emitted by the observation object 3 from irradiation with excitation light is condensed by the objective lens 13. Then this fluorescence is transmitted by the dichroic mirror 12 and excitation light cut filter 15 to be focused by the imaging lens 16.

When capturing an image, scanning is performed in one direction (lengthwise direction) of the slide glass 2 in conjunction with movement in a two-dimensional direction of the stage S. By doing so, concurrently with image capture of a region with the image capturing element 18, successive image capture is repeated in the other direction (short side direction). The optical device of the present embodiment has this kind of functionality. In this case, as shown in FIG. 3, the region to be captured for the second time onward partially overlaps the immediately preceding region, for example, overlapping the region by 5% of the entire region. Also, along with recording the fluorescence image in each region, the image capturing element 18 sends it to the image processing section.

The dark field illumination means 5 has an optical system 20, filter 21, ring aperture 22 and condenser lens 23. The dark field illumination means 5 is arranged on the opposite side of the excitation light irradiation means 4 and image capturing means 6, sandwiching the slide glass 2. Therefore, the dark field illumination means 5 forms a transmitting-type illumination device. The optical system 20 includes a light source for the dark field illumination observation. The filter 21 transmits light of an equivalent wavelength as fluorescence from among the light irradiated from the optical system 20. The ring aperture 22 and the condenser lens 23 irradiate light transmitted from the filter 21 onto the slide glass 2 from an angle outside the numerical aperture of the objective lens 13.

In addition, each of the aforementioned components is comprehensively controlled by a controller not shown.

Reproducing an image of the entire observation object 3 with the optical device 1 constituted thus is described below.

First, stage S is driven to move slide glass 2 to the initial position for performing observation. Then light is irradiated by optical systems 10, 20.

Light irradiated from optical system 10 becomes excitation light of the predetermined wavelength by means of excitation filter 11. After being reflected by the dichroic mirror 12, the excitation light is irradiated onto specimen surface 2a (top surface) of the slide glass 2 by the objective lens 13.

The fluorescence material of the observation object 3 on the slide glass 2, reacting to the irradiation of excitation light, emits fluorescence. This fluorescence, after being condensed by the objective lens 13, passes the dichroic mirror 12 and the excitation light cut filter 15 in turn and is made incident on the imaging lens 16. Excess excitation light that did not contribute to the generation of fluorescence is cut by the excitation light cut filter 15. Therefore, it is certain that only fluorescence is made incident on the imaging lens 16.

In addition, fluorescence made incident on the imaging lens 16 is focused on the imaging surface 17 and recorded by the image capturing element 18.

From among the light emitted from the optical system 20, light of an equivalent wavelength as fluorescence is irradiated from the filter 21. This light is irradiated by the ring aperture 22 and condenser lens 23 so as to pass the slide glass 2 from a predetermined range. This predetermined range is the range further outside the angle expressed by the numerical aperture of the objective lens 13. The light irradiated on the slide glass 2 scatters against the pattern P. The refraction index of the observation object 3, such as cells, is approximately the same as water of the incubation liquid and the like. As a result, the scattering of the light on the observation object 3 is extremely small. Therefore, compared to the scattered light at the pattern P, the light intensity is of a degree that can be ignored.

Here, a portion of the scattered light has a wavelength equivalent to the aforementioned fluorescence. Therefore, after being condensed by the objective lens 13, it passes the dichroic mirror 12 and the excitation light cut filter 15 similarly to fluorescence. Then it is focused by the imaging lens 16 and captured by the image capturing element 18.

That is, the optical device of the present embodiment can simultaneously perform fluorescence observation and dark field illumination observation. In other words, the fluorescence image of the observation object 3 and pattern P image can be recognized in the same field of view. As shown in FIG. 3, in this state, stage S is moved in one direction (lengthwise direction) of the slide glass 2. Image capture for the scan image, that is, for one region, is performed by the image capturing means 6.

After image capture for the first region is completed, stage S is moved in the opposite direction and returns to its original position. Then, as shown in FIG. 3, the stage S is moved in another direction (short side direction) so that the regions of slide glass 2 partially overlap (for example, overlaps 5% of the entire region). Then, in the same way as described above, stage S is again moved in one direction (lengthwise direction) and image capture for the next region is performed by the image capturing means 6 to obtain the scan image. In this case, the same pattern P captured at the first region is captured at the overlapping portion.

In this way, the image capturing element 18 successively and repeatedly performs image capture for each region, and a plurality of scan images are obtained (captured). The image processing section 19 records the plurality of scan images that are obtained. Furthermore, using the recorded scan images of each region, the image processing section 19 composites adjacent scan images so as to match the same pattern P appearing on the overlapping portion. This enables a scanned image divided into a plurality of regions to be correctly reproduced in a single image without a sense of incongruity.

As stated above, in the optical device 1 of the present embodiment, by matching the same pattern P appearing on the overlapping portion of each scan image, a plurality of scan images are composited to make a single image without a sense of incongruity. Therefore, according to the optical device 1 of the present embodiment, even if there is a slight error in the driving of the stage S, the entire fluorescence image of the slide glass 2 can be correctly reproduced.

Because fluorescence observation and dark field illumination observation can be simultaneously performed, the time required for observation can be shortened. Moreover, cost can be reduced because a special optical system is not required.

In particular, in the optical device 1 of the present embodiment, excitation light can assuredly be irradiated onto the slide glass 2 by the excitation filter 11, dichroic mirror 12 and objective lens 13. In the optical device 1 of the present embodiment, light of extraneous wavelengths among the returning light from the slide glass 2 is cut by the excitation light cut filter 15, so that only fluorescence is definitely made incident on the imaging lens 16. Accordingly, a clear image can be obtained by the optical device 1 of the present embodiment.

Next, the second embodiment of the optical device according to the present invention is explained below with reference to FIG. 4. In this second embodiment, the same component elements as in the first embodiment have the same reference numerals and so their explanation is omitted.

A point of difference between the second embodiment and the first embodiment is the difference in the position that the dark field illumination means 5 is arranged. That is, in the first embodiment, the dark field illumination means 5 is a transmitting type arranged on the opposite side of the excitation light irradiation means 4 and image capturing means 6, sandwiching the slide glass 2. In contrast, in the optical device 30 of the second embodiment, dark field illumination means 31 is a vertical illumination type. And while the slide glass 2 is mounted on stage S that can be moved in a two-dimensional direction (horizontal direction), the dark field illumination means 31 is arranged on the same side as the excitation light irradiation means 32 and the image capturing means 6. The present embodiment employs the same stage S as in the aforementioned first embodiment, but opening Sh does not have to be made.

Figure 4:
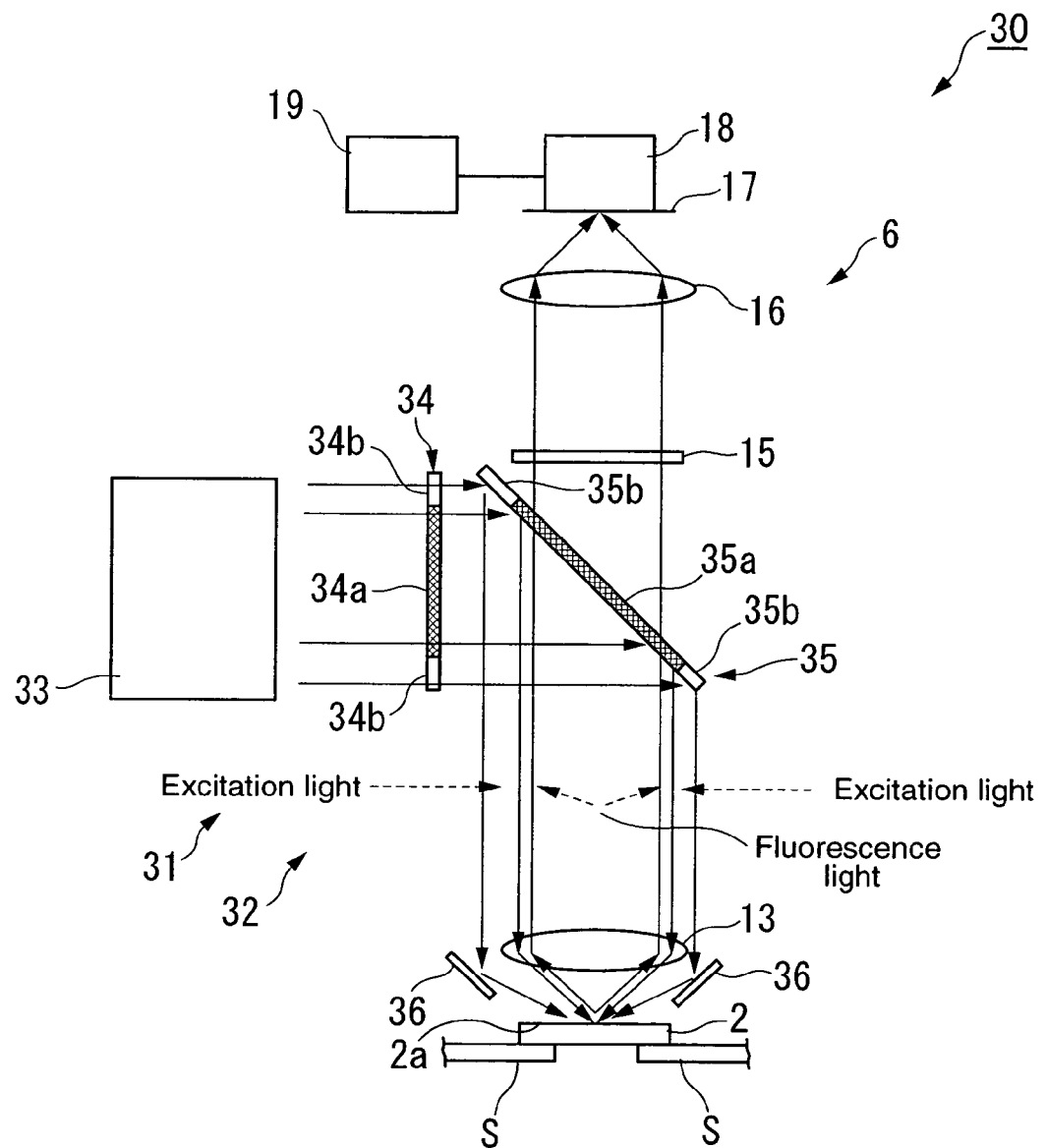
FIG. 4 is a block diagram showing the second embodiment of the optical device according to the present invention.

As shown in FIG. 4, the optical device 30 in the present embodiment is provided with an optical system 33, an excitation filter 34, a dichroic mirror 35 and a mirror 36. Here, the optical system 33 includes a light source for fluorescence observation and dark field observation.

The excitation filter 34 comprises a circular inner part 34a and a ring-band shaped outer part 34b. The diameter of the inner part 34a is set so that light passing the inner part 34a passes the inside the effective diameter of the objective lens 13. Also, when passing the inner part 34a, only light of the predetermined wavelength (excitation light) is transmitted. This predetermined wavelength is light of a wavelength that excites the fluorescence material of the observation object 3 to emit fluorescence.

The outer part 34b has the characteristic of transmitting light of an equivalent wavelength as the said fluorescence light. Also, the inner diameter of the outer part 34b is set so that light passes outside the effective diameter of the objective lens 13.

The dichroic mirror 35 comprises a circular inner part 35a and a ring-band shaped outer part 35b. Here, the inner part 35a reflects excitation light that passes the inner part 34a toward the objective lens 13. The inner part 35 has a function to transmit fluorescence and light of an equivalent wavelength as fluorescence in addition to a function to reflect excitation light. The outer part 35b is made to reflect light of an equivalent wavelength as fluorescence.

The mirror 36 is outside the objective lens 13 and arranged to be located between the objective lens 13 and the slide glass 2. Light reflected by the outer part 35b of the dichroic mirror 35 is irradiated onto the specimen surface 2a (top surface) of the slide glass 2.

In other words, the optical system 33, excitation filter 34, dichroic mirror 35 and objective lens 13 constitute the excitation light irradiation means 32. Also, the optical system 33, excitation filter 34, dichroic mirror 35 and mirror 36 constitute the dark field illumination means 31.

The case of obtaining the entire image of observation object 3 with the optical system 30 constituted thus is now explained.

Among light emitted from the optical system 33, the light made incident on the inner part 34a of the excitation filter 34 becomes excitation light by the filter of the inner part 34a. This excitation light, after being reflected by the inner part 35a of the dichroic mirror 35, is irradiated onto the specimen surface 2a (top surface) of the slide glass 2 by the objective lens 13.

The fluorescence emitted from the observation object 3 by irradiation with excitation light, after being transmitted through the inner part 35a of the dichroic mirror 35 and the excitation light cut filter 15, is made incident on the image capturing element 18. Here, a fluorescence image of the specimen object 3 is formed, so a fluorescence image is captured by the image capturing element.

Among the light emitted from the optical system 33, light passing the outer part 34b of the excitation filter 34 becomes light that includes a wavelength equivalent to fluorescence. This light is reflected by the outer part 35b of the dichroic mirror 35 and made incident on the mirror 36 arranged on the outside of the objective lens 13. This light is reflected by the mirror 36 and then irradiated onto the pattern P of the slide glass 2.

The wavelength of light that scatters against pattern P is light of an equivalent wavelength as the said fluorescence light. Therefore, similarly to fluorescence, after being transmitted through the inner part 35a of the dichroic mirror 35 and the excitation light cut filter 15, it is made incident on the image capturing element 18. Here, the image of the pattern P is formed, so that image is captured by the image capturing element.

In this way, fluorescence observation and dark field illumination observation can be simultaneously performed in the optical device 30. In other words, the fluorescence of the observation object 3 and pattern P can be observed (recognized) in the same image. Similarly to the first embodiment, in this state, stage S is moved and the scan image of each region is captured. The image processing section 19 composites adjacent scan images so as to match the same pattern P appearing on the portion overlapping each scan image. This enables a scanned image divided into a plurality of regions to be correctly reproduced in a single image without a sense of incongruity.

In particular, with the optical device 30 of the present embodiment, the entire device can be made compact because the dark field illumination means 31, excitation light irradiation means 32 and image capturing means 6 are arranged on the same side.

Next, the third embodiment of the optical device and imaging method according to the present invention is explained below with reference to FIGS. 9 to 13. In this third embodiment, the same component elements as in the first or second embodiment have the same reference numerals and so their explanation is omitted.

Figure 9:
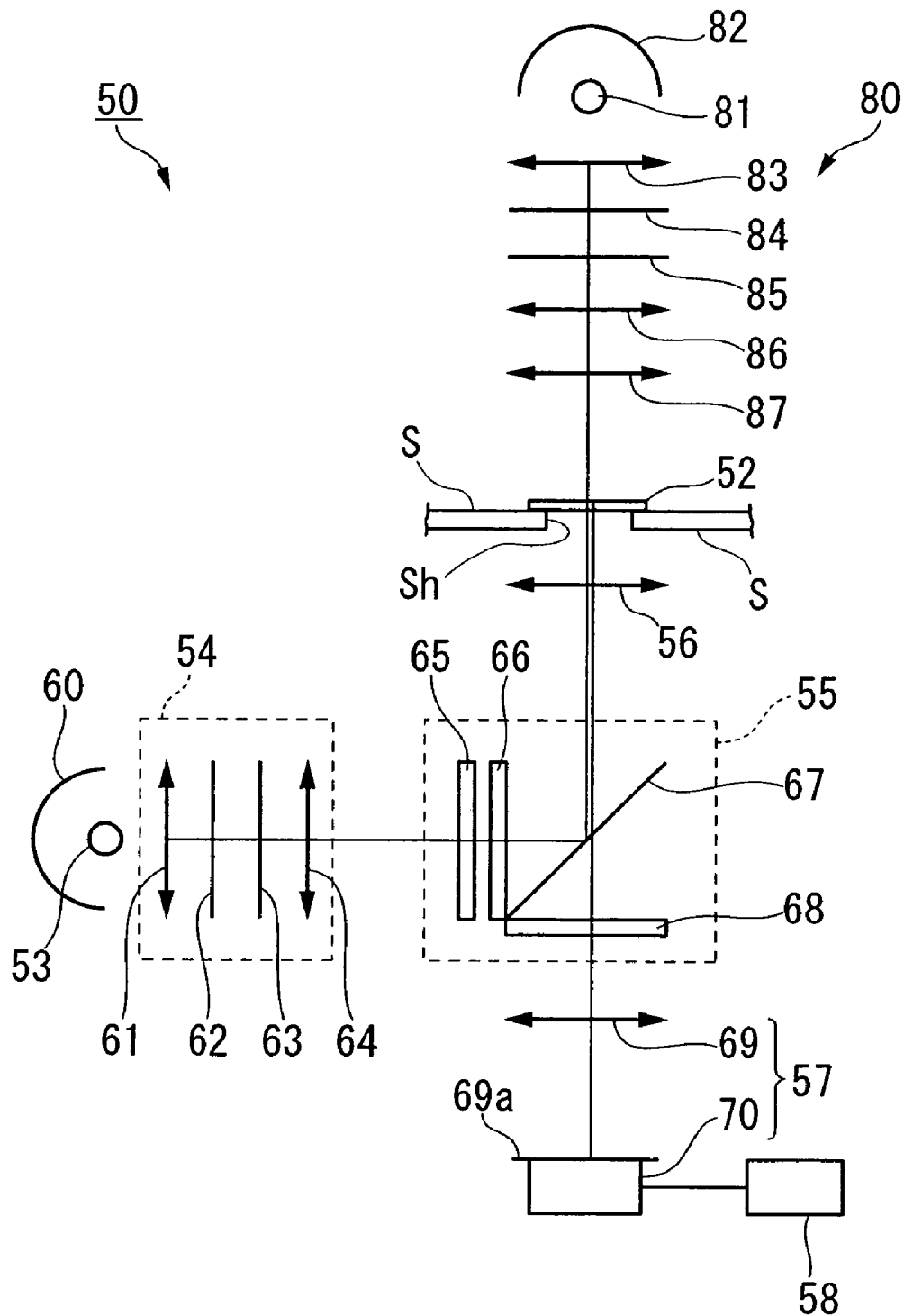
FIG. 9 is a block diagram showing the third embodiment of the optical device according to the present invention.

The optical device 50 of the present embodiment is an inverted fluorescence microscope. In this optical device 50, as shown in FIG. 9, cells (specimen) A held on the slide glass (carrier) 52 are observed from below. This optical device 50 is provided with a light source 53, an illumination optical system 54, a fluorescence cube 55, an objective lens 56, an image capturing means 57 and an image processing section 58.

Figure 10:
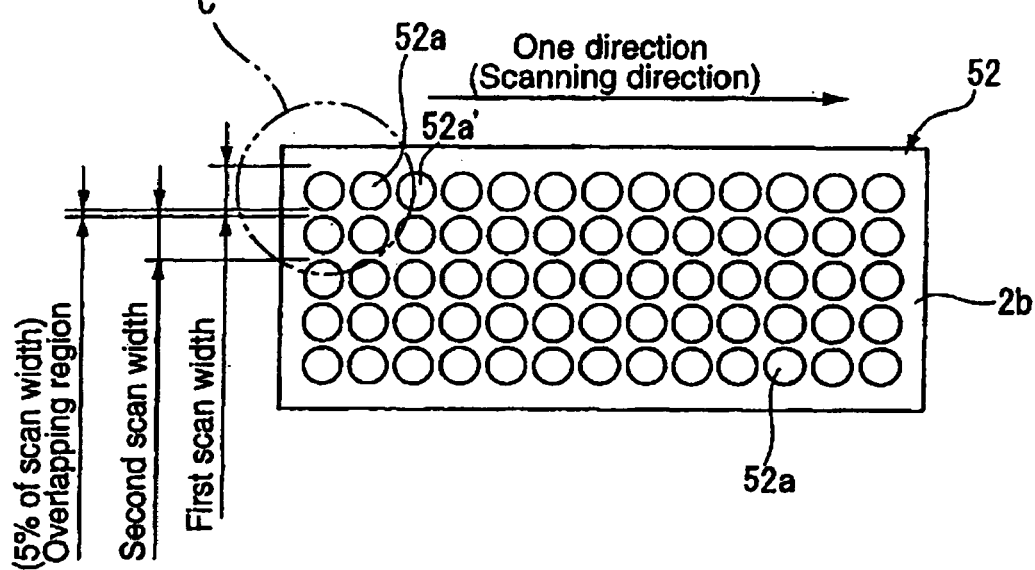
FIG. 10 is a top view showing an example of the slide glass used in the optical device shown in FIG. 9.
Figure 11:
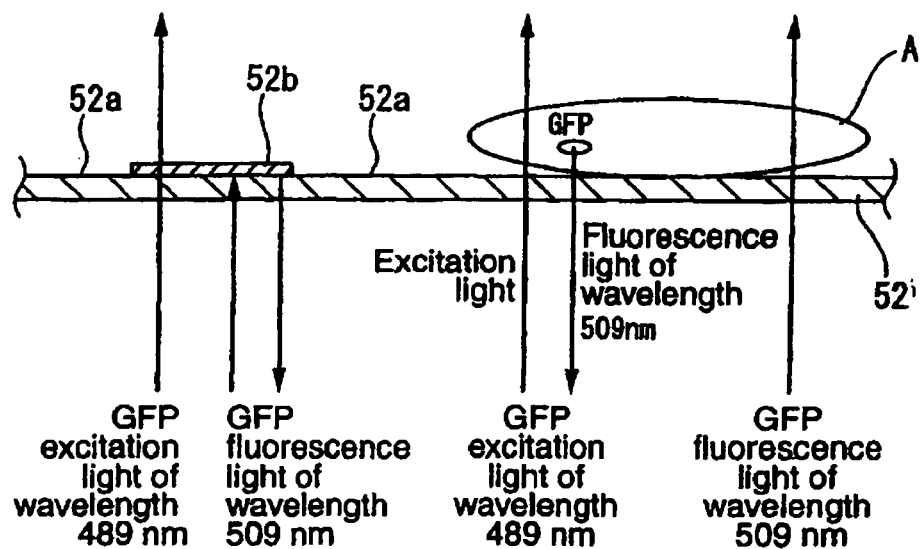
FIG. 11 is a cross-sectional view of the slide glass shown in FIG. 10.

The slide glass 52, as shown in FIGS. 10 and 11, is formed in a rectangular shape extending in a first direction (scan direction). A plurality of specimen incubation portions 52a each holding cells A are formed. Separator portions are formed between adjacent specimen incubation portions 52a to isolate them. These separator portions as a whole form a lattice shaped pattern (hereafter, referred to as two-dimensional pattern section 52b).

Figure 12:
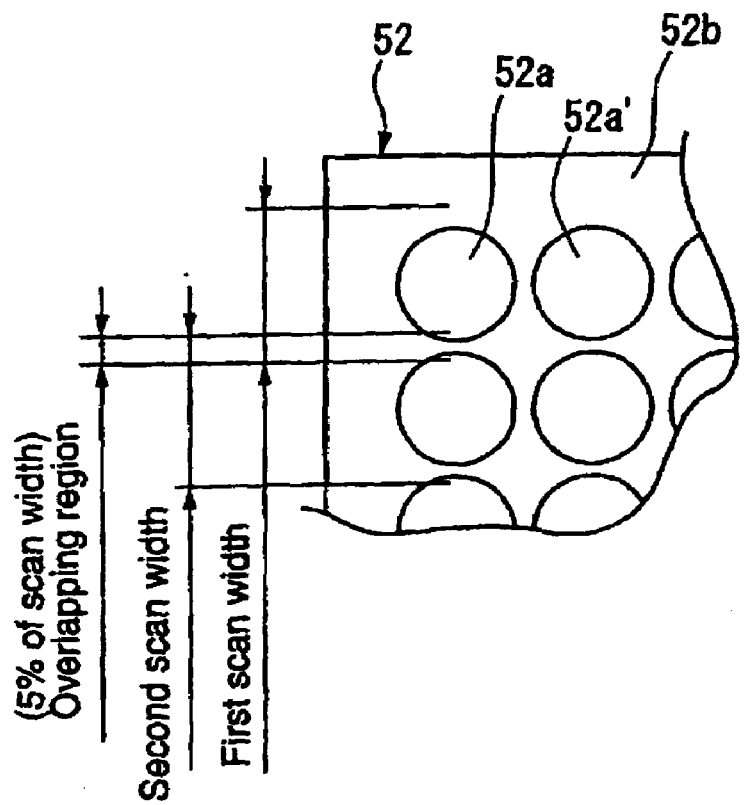
FIG. 12 is an enlarged view of region C in the slide glass shown in FIG. 10.

The specimen incubation portions 52a are formed so that the outer circumference is circular. Also, the specimen incubation portions 52a are disposed at a predetermined interval in the first direction and a direction perpendicular to the first direction (second direction). In this case, the size of the specimen incubation portion 52a is formed to be smaller than the scan width described below. For example, as shown in FIG. 12, the diameter is formed to be 95% of the scan width. The slide glass 52 is mounted on stage S that has opening Sh and can be moved in a two-dimensional direction (horizontal direction). That is, this stage S functions as a movement mechanism that changes the relative positional relation between the slide glass 52 and the objective lens 56.

A plurality of cells A are held in each specimen incubation portion 52a. The cells A include Green Fluorescent Protein (GFP, a fluorescent material). GFP, as shown in FIG. 11, emits fluorescence with a wavelength of 509 nm when irradiated with excitation light with a wavelength of 489 nm.

The two-dimensional pattern section 52b is a region other than then specimen incubation portion 52a on the slide glass 52. A coating is applied to this two-dimensional pattern section 52b so as to reflect the fluorescence wavelength emitted by the GFP, specifically, light of a wavelength the same as 509 nm. An example of this coating is a dichroic coat. The two-dimensional pattern section 52b also serves as a lyophobic region that repels liquid.

In this embodiment, the reflectance Re of the coated portion is characterized by being in the range of 1%<Re<20%, for example, 10%, for light of a predetermined wavelength (or wavelength band). For example, the two-dimensional pattern section 52b reflects 10% of light of a wavelength of 509 nm. The coated portion transmits light of other wavelengths, such as light of a wavelength of 489 nm. The region within the specimen incubation portion 52a is not coated. Therefore, the inside of specimen incubation portion 52a transmits light of both wavelengths 509 nm and 489 nm.

Because of this, in the present embodiment, most light of a wavelength of 509 nm is transmitted through the specimen incubation portion 52a, while a portion is reflected by the two-dimensional pattern section 52b. As a result, in this embodiment, a difference in brightness occurs sandwiching the boundary of the specimen incubation portion 52a and the two-dimensional pattern section 52b. In this embodiment, the pattern of this brightness that occurs sandwiching this boundary is utilized as a characteristic in image compositing described later.

As shown in FIG. 9, a mirror 60 is arranged around a light source 53 so that the light source emits light in one direction (the right side on the page). Also, the wavelengths 509 nm and 489 nm are included in the light emitted from this light source 53.

The illumination optical system 54 has a collector lens 61, an aperture stop 62, a field stop 63 and a field lens 64 in that order from the light source 53 side. The illumination optical system 54 has a function to lead light emitted from the light source 53 to the objective lens 56.

The fluorescence cube 55 is arranged between the illumination optical system 54 and the objective lens 56. The fluorescence cube 55 has an intensity adjustment filter (intensity changing means) 65, excitation filter 66, dichroic mirror 67 and excitation light cut filter 68.

The intensity adjustment filter 65 is arranged to be adjacent to the illumination optical system 54. This intensity adjustment filter 65 has a function to adjust the intensity of light of a wavelength of 509 nm in illumination light emitted from the illumination optical system 54 to a predetermined intensity. This intensity is determined by the interrelation of the reflectance Re of the mirror coating and the reflectance Rd of the dichroic mirror 67 explained below. This will be explained in more detail later.

The excitation filter 66 is arranged so as to be adjacent to the intensity adjustment filter 65. This excitation filter 66 has a function to transmit light of a predetermined wavelength, in other words, only light of the two wavelengths 509 nm and 489 nm.

The dichroic mirror 67 is arranged so as to be adjacent to the excitation filter 66. This dichroic mirror 67 has a function to reflect light of wavelengths 509 nm and 489 nm transmitted by the excitation filter 66 to the objective lens 56. In this case, the reflectance Rd of dichroic mirror 67 for reflecting 509 nm light is set to be in a range of 1%<Rd<10%, for example 5%. It is set to reflect 100% of light of a wavelength of 489 nm.

Figure 13:
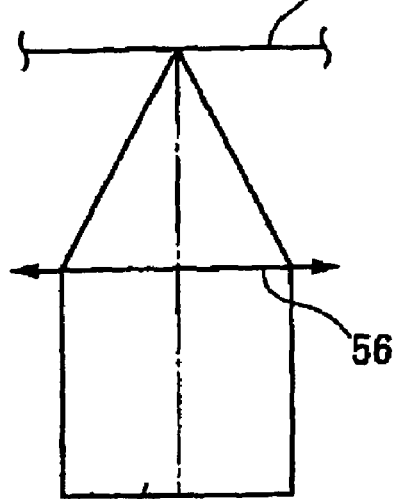
FIG. 13 is a side view showing the state of irradiating light of wavelengths 489 nm and 509 nm onto the slide glass by the objective lens.

The objective lens 56 is able to irradiate light reflected by the dichroic mirror 67, that is, light of wavelengths 509 nm and 489 nm, onto the surface of the slide glass 52, as shown in FIG. 13.

The excitation light cut filter 68 is arranged so as to face the objective lens 56, sandwiching the dichroic mirror 67. This excitation light cut filter 68 has a function to cut light of a predetermined wavelength among returning light from the slide glass 52, more specifically, 489 nm light.

The image capturing means 57 has an imaging lens 69 and an image capturing element 70. The imaging lens 69 focuses light transmitted through the excitation light cut filter 68, specifically 489 nm light, on the imaging surface 69a of the imaging lens 69. The image capturing element 70 is a CCD or the like arranged for example on the imaging surface 69a. By this, 509 nm light that is transmitted through the excitation light cut filter 68 is collected by the imaging lens 69 to form an image. This image is then captured by the image capturing element 70.

The slide glass 52 and the image capturing means 57 are constituted to move relative to each other.

In the present embodiment, the position of the image capturing element 70 is fixed, while the slide glass 52 is moved by means of the stage S. At this time, the slide glass 52 moves in two directions that are perpendicular.

As stated above, the slide glass 52 moves relative to the image capturing element 70. As shown in FIGS. 10 and 12, as a result the image capturing element 70 performs image capture so as to scan the slide glass 52 in a line shape along one direction (the lengthwise direction of the slide glass 52). After the image capturing element 70 picks up the image of one region (scan width), it moves in a direction perpendicular to the first direction (second direction). Then from the position it has moved to, it again performs image capture along the first direction. In this way, in the present embodiment, image capture of a plurality of regions is performed by repeating image capture in the first direction and movement in the second direction. By doing so, the entire image of the slide glass 52 can be captured. When picking up the image, the image capturing element 70 and slide glass 52 are positioned so that the center of the specimen incubation portion 52a corresponds to the center line of the scan width.

In the present embodiment, when picking up images, adjacent regions are captured so as to partially overlap each other. In other words, in the present embodiment, the movement of the stage S in the second direction is controlled so that adjacent regions partially overlap. The proportion of the overlap is such that the region corresponding to 5% of the scan width for the second image capture and onward overlaps the region corresponding to 5% of the initially captured scan width.

Here, in relation to the second direction, a portion of the entire first specimen incubation portion 52a and the second specimen incubation portion 52a' is included in the scan width. The first specimen incubation portion 52a is the specimen incubation portion in which cells A, the object to be captured, are held. The second specimen incubation portion 52a' is the specimen incubation portion adjacent to the first specimen incubation portion 52a. This specimen incubation portion 52a' is located in the second direction. The boundary between the specimen incubation portion 52a and the two-dimensional pattern section 52b (outline of the specimen incubation portion 52a), and the boundary between the specimen incubation portion 52a' and the two-dimensional pattern section 52b (outline of the specimen incubation portion 52a') are included in the region of the 5% overlap. Accordingly, in the present embodiment, there exists a common boundary (characteristic part) in both the image obtained in the initial scan and the adjacent image obtained in the next scan.

The image capturing element 70 sends the scan image that is captured to the image processing section 58. The image processing section 58 once stores the scanned images sent from the image capturing element 70. The scan images are then composited by matching the boundaries appearing on the overlapping portions. The image processing section 58 detects the boundaries by the difference between the brightness of the specimen incubation portion 52a and the brightness of the two-dimensional pattern section 52b. This is explained in more detail below.

In the present embodiment, the intensity of 509 nm light reflected by the two-dimensional pattern section 52b is set to be within a range of ±10% of the intensity of 509 nm light emitted from the GFP. The intensity of the 509 nm light reflected by the two-dimensional pattern section 52b is determined by the aforementioned product of the intensity (transmittance) of the intensity adjustment filter 65, the 5% reflectance (Rd) of the dichroic mirror 67, and the 10% reflectance (Re) of the mirror coating of the two-dimensional pattern section 52b.

The optical device 50 of the present embodiment is provided with a transmitted illumination optical system 80 arranged above the slide glass 52 as shown in FIG. 9. Specifically, the transmitted illumination optical system 80 is provided with a light source 81, a mirror 82, a collector lens 83, an aperture stop 84, a field aperture 85 and field lenses 86 and 87.

Here, the mirror 82 emits light from the light source 81 in one direction (the lower side with respect to the page). The collector lens 83 irradiates light emitted from the light source 81 onto the slide glass 52.

Generating a single image on the entire slide glass with the optical device 50 thus constituted is explained below.

First, the slide glass 52 is moved to the initial position by driving the stage S. Then, the irradiation step is performed to irradiate light from the light source 53 to the slide glass 52 via the illumination optical system 54.

Specifically, light irradiated from the light source 53, after being reflected by the internal circumferential face of the mirror 60, is made incident on the collector lens 61. The light made incident on the collector lens 61, after becoming parallel rays, passes the aperture stop 62, the field stop 63 and the field lens 64 and is then made incident on the intensity adjustment filter 65.

The light made incident on the intensity adjustment filter 65 is adjusted so that the intensity of the fluorescence wavelength 509 nm light becomes the predetermined intensity. Wavelengths of the illumination light other than the 489 nm excitation and 509 nm fluorescence are cut. Therefore, only the 489 nm excitation and 509 nm fluorescence are made incident on the dichroic mirror 67. Of the light made incident on the dichroic mirror 67, 100% of the 489 nm excitation and 5% of the 509 nm fluorescence are reflected and made incident on the objective lens 56. Then, the light of both wavelengths 489 nm and 509 nm is irradiated onto the surface of the slide glass 52 from the lower side as shown in FIG. 13 (irradiation step).

The light of wavelengths 489 nm and 509 nm is irradiated on the two-dimensional pattern section 52b. The 489 nm light is transmitted through the two-dimensional pattern section 52b, while 10% of the 509 nm light is reflected by the mirror coating. As shown in FIG. 9, this reflected 509 nm light is transmitted in turn by the dichroic mirror 67 and excitation light cut filter 68 and then made incident on the imaging lens 69. The 489 nm light is also somewhat reflected by the two-dimensional pattern section 52b. However, even if 489 nm light creeps in, it is cut by the excitation light cut filter 68. Therefore, it is certain that only the 509 nm light is made incident on the imaging lens 69.

As shown in FIG. 11, in the region where there are no cells A in the specimen incubation portion 52a, or the region where even if there are cells A, there is no GFP, both 489 nm and 509 nm light are transmitted through the specimen incubation portion 52a or cells A.

On the other hand, in the portion where GFP exists in cells A, excitation wavelength 489 nm is received, causing the GFP to emit 509 nm fluorescence. Similarly to the fluorescence wavelength 509 nm reflected by the aforementioned two-dimensional pattern section 52b, this fluorescence is transmitted successively by the dichroic mirror 67 and excitation light cut filter 68 and then made incident on the imaging lens 69.

After performing the aforementioned irradiation step, the image capture step is performed. In this image capture step, the entire slide glass 52 is divided into a plurality of regions whose images are then captured. During image capture, the scan regions are captured so as to partially overlap. First, the 509 nm light made incident on the imaging lens 69, after being focused on the imaging surface 69a, is captured by the image capturing element 70. This 509 nm light includes fluorescence generated from the two-dimensional pattern section 52b and the GFP. That is, the image capturing element 70 simultaneously picks up 509 nm light reflected by the two-dimensional pattern section 52b and 509 nm light emitted by the GFP without requiring a special optical system. As stated above, the intensity of the light reflected by the two-dimensional pattern section 52b is set to a suitable intensity by the intensity of the intensity adjustment filter 65, the reflectance (Rd) of the dichroic mirror 67, and the reflectance (Re) of the mirror coating of the two-dimensional pattern section 52b. Specifically, the intensity of light reflected by the two-dimensional pattern section 52b is set to be within a range of +/−10% of the intensity of light emitted by GFP. Because of this, the image can be surely accommodated in the dynamic range of the image capturing element 70 and captured with clear distinction and high contrast. The image capturing element 70 sends the captured scan images to the image processing section 58.

During image capture, as shown in FIGS. 10 and 12, the stage S is moved in the first direction and the image scanning, that is, the image capture for one region, is performed. After the image capture for this first region is complete, the stage S is moved in a direction opposite to the first direction and returned to the original position. Then, the slide glass 52 is moved in the second direction via the stage S so that the next image capture region partially overlaps the first image capture region. At this time, the stage S is moved so that 5% of the scan width of the next image capture region overlaps 5% of the scan width of the first image capture region. After which, similar to as described above, the stage S is again moved in the first direction, and the next scan image is obtained by the image capturing means 20. In this case, the characteristic part captured in the first region, specifically, the boundary between the specimen incubation portion 52a and the two-dimensional pattern section 52b, is captured in the overlapping portion.

In this way, in the image capture step, the entire slide glass 52 is divided into a plurality of regions and captured by repeating the image capture so that scan images partially overlap each other.

After the image capture step is completed, the compositing step is performed. In this compositing step, the scan images that captured the plurality of regions are composited so as to match the same characteristic parts appearing on the overlapping portions. Specifically, the image processing section 58 records the plurality of scan images sent from the image capturing element 70 and composites the adjacent scan images. This enables a plurality of scan images to be easily and surely produced in a single image without a sense of incongruity.

As described above, the specimen incubation portions 52a and two-dimensional pattern section 52b are the structure of the slide glass 52 itself. Accordingly, the boundary formed by both, in other words, the characteristic part, always exists.

There is hardly any fluorescence generated by GFP near the boundary. This is because cells A are approximately in the central part of the specimen incubation portion 52a and the position of the GFP is also inside the cells A. Because of this, the boundary can be clearly recognized. In this way, according to the present embodiment, the emission position of fluorescence emitted by the GFP and the position of light reflected by the two-dimensional pattern section 52b can be clearly distinguished. This enables the characteristic portion to be certainly distinguished from the cells A (the fluorescence emitted by the GFP) even if the light made incident on the image capturing element 70 is the same 509 nm light. Accordingly, the boundary can be certainly detected by the intensity difference between the light (509 nm light) of the specimen incubation portion 52a and the two-dimensional pattern section 52b.

Furthermore, the optical device 50 of the present embodiment is provided with the transmitted illumination optical system 80 so observation by transmitted illumination is also possible.

As stated above, according to the optical device 50 and imaging method, even if there is a slight error in the driving of the stage S, the fluorescence image of the entire slide glass 52 can be correctly produced as one image. Also, because fluorescence observation and image capture of the characteristic part can be simultaneously performed, the time required for observation can be shortened. Moreover, because the characteristic part is based on the structure of the slide glass 52 itself, it can always be detected.

This optical device 50 is provided with the excitation filter 66, dichroic mirror 67 and objective lens 56, which are the basic components of the fluorescence microscope. Therefore, 489 nm excitation and 509 nm fluorescence can be certainly irradiated on the slide glass 52 without requiring a special optical system. Also, the excitation light cut filter 68 allows only fluorescence and 509 nm light of an equivalent wavelength as fluorescence to be made incident on the image capturing means 57, enabling a clear image to be obtained.

Also, the intensity of the intensity adjustment filter 65, the reflectance (Rd) of the dichroic mirror 67, and the reflectance (Re) of the mirror coating of the two-dimensional pattern section 52b are suitably set. Doing so adjusts the intensity of 509 nm light reflected by the two-dimensional pattern section 52b to a suitable intensity with regard to the intensity of fluorescence emitted by the GFP. This enables fluorescence observation of cells A and image capture of the characteristic part to be performed with certainty in the dynamic range of the image capturing means 57.

Next, the fourth embodiment of the optical device according to the present invention is explained with reference to FIG. 14. In this fourth embodiment, the same component elements as in the third embodiment have the same reference numerals and so their explanation is omitted.

A point of difference between the fourth embodiment and the third embodiment is the point of performing fluorescence observation and image capture of a reference mark by irradiating 489 nm excitation light.

Figure 14:
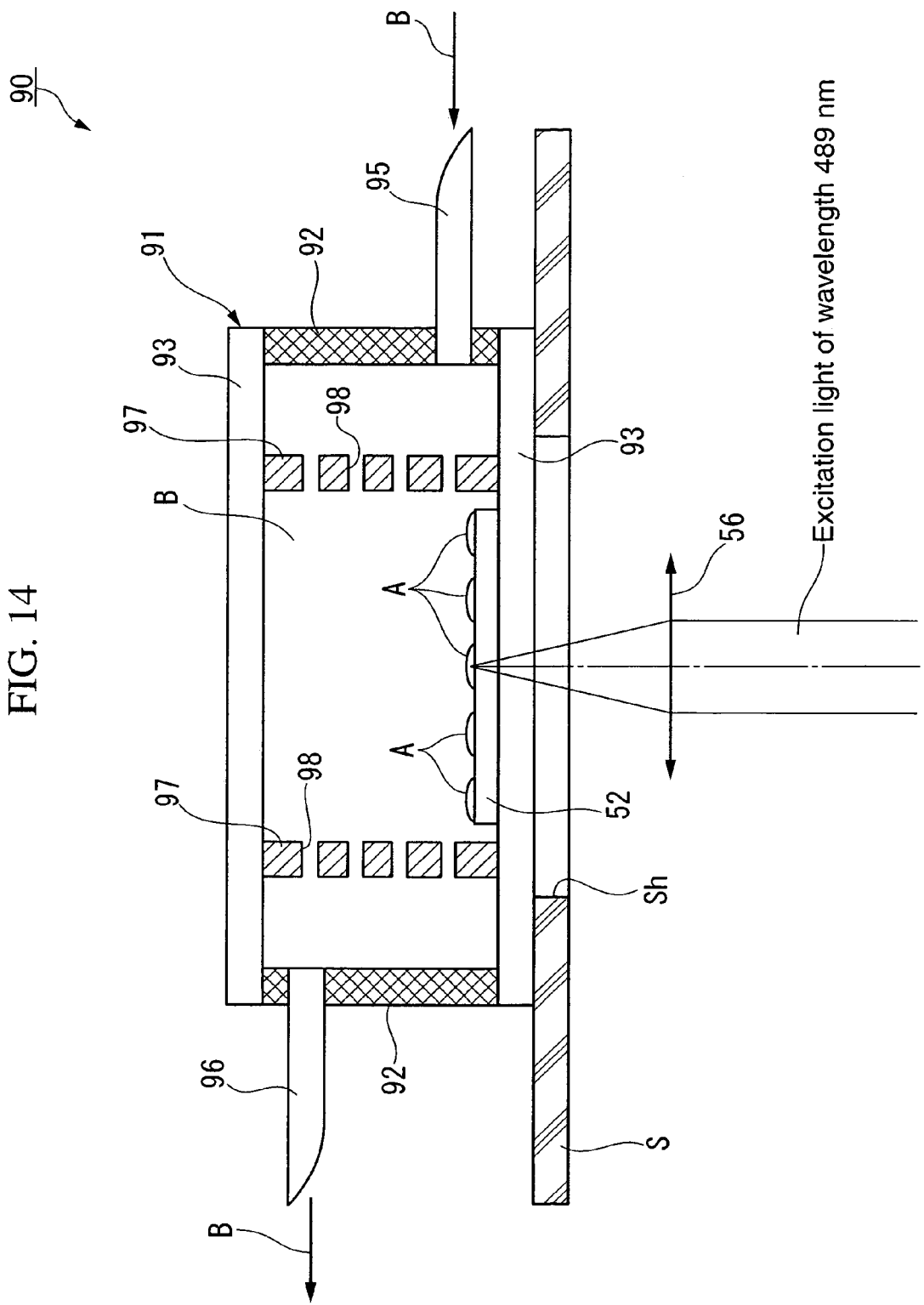
FIG. 14 is a diagram showing the fourth embodiment of the optical device according to the present invention, being a cross-sectional view showing the state of irradiating light of the excitation wavelength 489 nm by the objective lens onto the slide glass housed in the incubator.

As shown in FIG. 14, the slide glass 52 of the optical device 90 of the fourth embodiment is arranged in the incubator 91 which is maintained at the predetermined incubation conditions along with the incubation liquid B.

This incubator 91 can be mounted on the stage S that has opening Sh and can be moved in a two-dimensional direction (horizontal direction), and is provided with a tubular case 92 and pair of glass plates 93. Here, the size of the opening is at least equivalent to the dimension of the slide glass 52. Also, the case 92 is tubular and capable of accommodating the slide glass 52. Furthermore, the case 92 is formed of a material with excellent heat conduction, for example, stainless steal or aluminum. The pair of glass plates 93 covers the upper and lower openings of the case 92 and has optically smooth surfaces.

Packing and the like not shown is arranged in the joint surfaces of the case 92 and the pair of glass plates 93, ensuring the interior is watertight. Fluororesin, for example, tetrafluoroethylene packing, can be used as the packing. This enables the interior of the incubator 91 to be made watertight even when removing the case 92 from the pair of glass plates 93 to house the slide glass 52 in the incubator 91.

A high-level hydrophilic process and the like for preventing the adhesion of incubation liquid B bubbles may be applied to the inner surface of the pair of glass plates 93. Also, after housing the slide glass 52, the pair of glass plates 93 may be closely fixed completely to the case 92 by a silicon adhesive and the like.

Also, the incubator 91 is provided with an incubation liquid supply pipe 95, incubation liquid discharge pipe 96 and a pair of flow distribution members 97. Here, the incubation liquid supply pipe 95 is for supplying incubation liquid B to the interior of the case 92. The incubation liquid discharge pipe 96 is for discharging waste incubation liquid B from the interior of the case 92. The pair of flow distribution members 97 is for dispersing the flow of the incubation liquid B.

The incubation liquid supply pipe 95 is provided on one end and on the lower side of the case 92, and the incubation liquid discharge pipe 96 is provided on the other end and on the upper side of the case 92. By doing so, the incubation liquid B supplied from the incubation liquid supply pipe 95 is discharged to the outside from the incubation liquid discharge pipe 96 after filling the interior of the incubator 42.

The incubation liquid supply pipe 95 is connected to the incubation liquid supply source not shown that controls the incubation liquid temperature. Incubation liquid B, which is controlled to the predetermined temperature of, for example, 37° C.±0.5° C., is supplied.

The said pair of flow distribution members 97 is provided between the incubation liquid supply pipe 95 and incubation liquid discharge pipe 96 and the slide glass 52. This pair of flow distribution members 97 is formed by a plate-shaped porous material having a plurality of through-holes 98 in the thickness direction. This enables the flow distribution member 97 on the incubation liquid supply pipe 95 side to disperse and pass incubation liquid B supplied to the interior to the plurality of through-holes 98. Also, the flow distribution member 97 on the incubation liquid discharge pipe 96 side can disperse and pass incubation liquid B to be discharged to the outside through the plurality of through-holes 98. In this way, the concentrated flow of the incubation liquid B can be converted to a dispersed flow by the flow distribution members 97. Accordingly, near the slide glass 52 on which cells A are disposed, it is possible to pass the incubation liquid B at a constant flow velocity and flow rate in nearly all regions of the cross section of the incubator 42.

In the optical device 90 of the present embodiment, the excitation filter 66 and the dichroic mirror 67 and the like are constituted. The enables irradiation of 489 nm light by the objective lens 56 onto the slide glass 52 in the incubator 91. The image processing section 58 is set so as to detect the boundary between the specimen incubation portion 52a and the two-dimensional pattern section 52b. This is explained in more detail below.

Here, in the present embodiment, a coating is applied to the two-dimensional pattern section 52b so as to transmit 489 nm light.

The case of generating the entire image of the slide glass as a single image with the optical device 90 constituted thus is explained.

First, the slide glass 52 holding the cells A is housed in the incubator 91, and then the incubation liquid supply source is activated to supply incubation liquid B from the incubation liquid supply pipe 95 to the inside of the incubator 91. In this way, the interior of the incubator 91 is set to the predetermined incubation conditions. This incubation liquid B that is supplied fills the inside of the incubator 91 via the pair of flow distribution members 97 and is discharged to outside the incubator 91 from the incubation liquid discharge pipe 96. In this way, the incubation liquid B is circulated so that fresh incubation liquid B is always supplied to the cells A.

Next, the irradiation step is performed, in which 489 nm light is irradiated from below the slide glass 52 by the objective lens. The 489 nm light irradiated on the two-dimensional pattern section 52b is transmitted through the two-dimensional pattern section 52b. On the other hand, the 489 nm light is transmitted through the specimen incubation portion 52a and incubation liquid B is irradiated. This causes the incubation liquid B to emit self-fluorescence of 509 nm. Also, in the case of cells A existing that include GFP, the GFP receives the 489 nm excitation and emits fluorescence. The image capturing means 57 also simultaneously picks up this fluorescence.

As stated above, in the image capture step, image capture is performed while moving the stage S similarly as in the third embodiment. Therefore, the image capturing element 70 performs image capture of the fluorescence and self-fluorescence at each region to obtain the scan images. In this case, light is not reflected from the two-dimensional pattern section 52b, so the brightness of the image of the two-dimensional pattern section 52b is close to zero. On the other hand, at the specimen incubation portion 52a, self-fluorescence is generated by the incubation liquid B, so the brightness of the specimen incubation portion 52a is brighter than the two-dimensional pattern section 52b. This allows the boundary between the specimen incubation portion 52a and the two-dimensional pattern section 52b to be certainly recognized. Therefore, in the compositing step, the image processing section 58 can accurately detect the boundary between the specimen incubation portion 52a and the two-dimensional pattern section 52b, specifically, the characteristic part. As a result, adjacent scans can be easily and accurately composited into a single image with no sense of incongruity.

As stated above, just by irradiating 489 excitation in the optical device 90 of the present embodiment, the fluorescence image of the cells A on the entire slide glass 52 can be produced in a single image. In particular, since there is no need to irradiate different wavelengths of light, the constitution can be simplified. Furthermore, long-term observation is possible because observation can be performed while cultivating cells A.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

Figure 5:
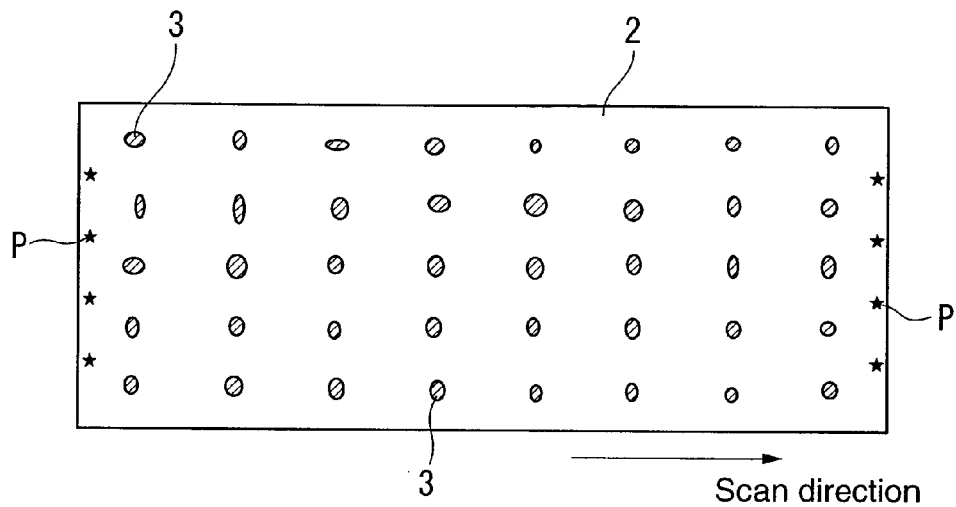
FIG. 5 is a top view of the slide glass showing an example of a pattern and a microarray type observation object whose images are captured by the optical device shown in FIG. 1 or FIG. 4.
Figure 6:
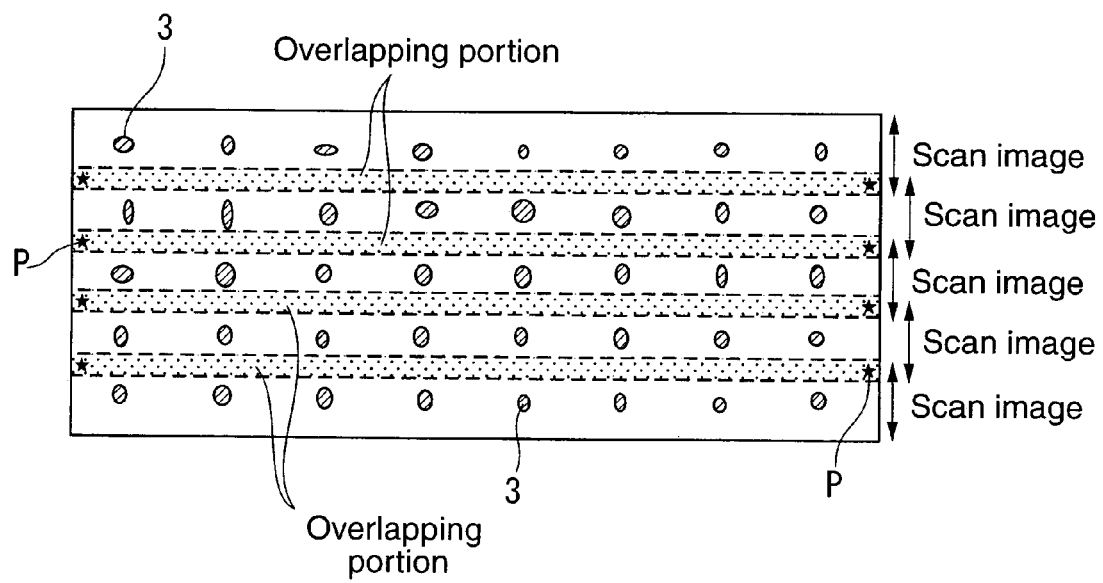
FIG. 6 is a diagram showing the state of scanning the slide glass shown in FIG. 5.

For example, in the aforementioned first and second embodiments, the observation object is a large single shape mounted substantially along the entirety of the slide glass, but is not limited to this. For example, as shown in FIG. 5, it may be different objects mounted in regularly and finely divided positions like a microarray. In this case, adjacent scan images captured in one direction (lengthwise direction) of the slide glass can be composited as a single image without a sense of incongruity by matching the same pattern appearing on the overlapping portion, as shown in FIG. 6.

Figure 7:
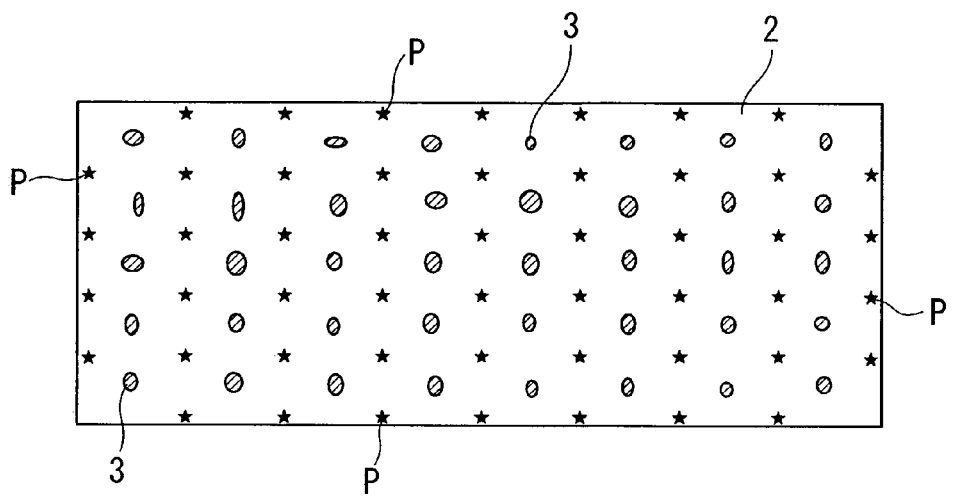
FIG. 7 is a top view of the slide glass showing an example of a pattern and a microarray type observation object whose images are captured by the optical device shown in FIG. 1 or FIG. 4.
Figure 8:
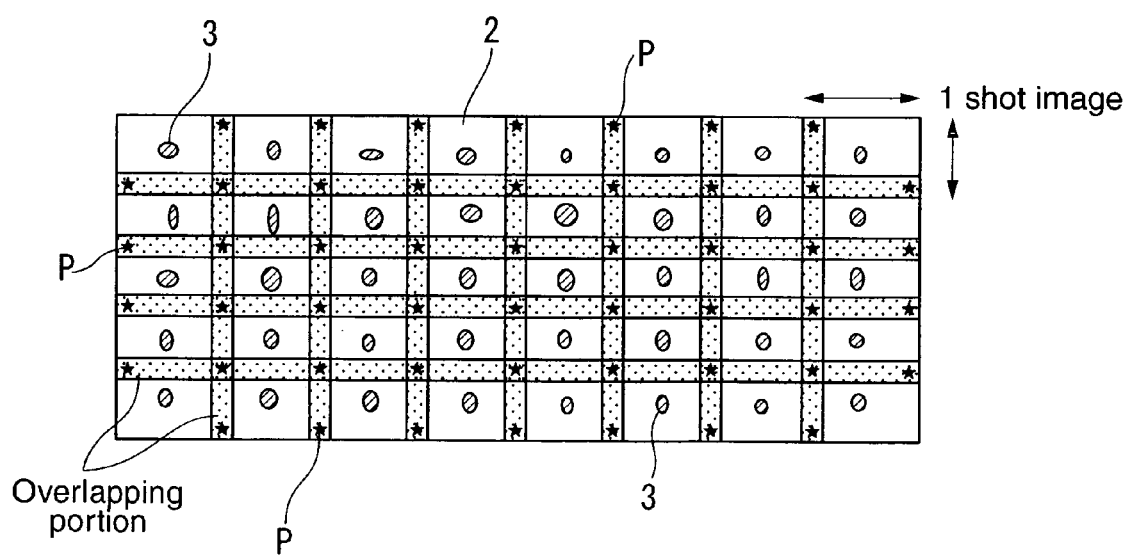
FIG. 8 is a diagram showing the state of capturing in single shots the image of the slide glass shown in FIG. 7.

Also, in the aforementioned first and second embodiments, the scan images are captured in one direction (lengthwise direction) of the slide glass, and these scan images are composited, but they are not limited to this. For example, as shown in FIG. 7, the pattern is regularly arranged in vertical and horizontal directions on the slide glass. As shown in FIG. 8, image capture is performed by the image capturing element so as to overlap the patterns. By doing so in this way, a plurality of single shot images can be composited. This is particularly effective when the observation object is a microarray.

Moreover, even when the magnification of the objective lens is varied, the variance in the magnification of the objective lens is free by using a slide glass having a pattern satisfying the aforementioned conditions. Also, this is not limited to the slide glass, and may, for example be the plate and that which is based on the plate.

In addition, the pattern is star-shaped but is not limited to this, and as long as it is a reference mark it may be any shape. In particular, if it is a shape by which both position and rotational information can be obtained, such as a cross, it is sufficient for there to be one per scan. However, if it is a shape by which only positional information, and not rotational information, can be obtained, such as a round dot, than two are needed per scan.

Also, for example, in the aforementioned third and fourth embodiments, the boundary between the specimen incubation portion and the two-dimensional pattern section serves as a reference mark, but it is not limited to this, and a reference mark may be imprinted. In this case, when performing image capture of multiple regions, it may be performed so that the reference mark appears on each region.

Also, the shape of the specimen incubation portion is tubular, but it may be polygonal, such as square, or elliptic, and so it not limited to a shape.

In the aforementioned third and fourth embodiments, 489 nm and 509 nm light was used, but the light is not limited to these wavelengths, and may be set arbitrarily. Also, in the third embodiment, the reflectance for reflecting 509 nm light by the dichroic mirror is set to 5%, but it may be set to a range of 1% to less than 10%. Similarly, the reflectance for reflecting 509 nm light by the mirror coating of the two-dimensional pattern section is set to 10%, but it may be set to a range of 1% to less than 20%. In particular, it is preferable to adjust these reflectances and the intensity adjustment filter intensity with consideration to the fluorescence intensity emitted by the GFP and the dynamic range of the image capturing element, and the like.

The optical device of the present invention is provided with a carrier that holds the specimen and has a reference mark, an image capturing means that captures an image of the specimen and the reference mark formed by an objective lens, a moving mechanism that moves the relative positional relation between the carrier and the objective lens, divides the imaging region into a plurality of regions so that adjacent regions partially overlap each other, and enables the image of the specimen and the reference mark in each region to be captured, and an image processing section that composites images of the plurality of regions captured by the image capturing means so as to match the same reference marks appearing on the overlapping portions.

According to this optical device, specimen image capture is performed with an image capturing means by dividing it into a plurality of regions so that adjacent regions partially overlap each other. In this case, a characteristic part (for example, a portion of the identical reference mark) is captured in the plurality of regions captured by the image capturing means, specifically, each image. Then, the image processing section correctly composites adjacent images by matching the identical reference mark appearing on the overlapping portion of each image.

This enables a plurality of images to be correctly produced as a single image without a sense of incongruity. Accordingly, even for a carrier that is larger than the field of view of the objective lens, the entire image of the carrier, that is the entire image of the specimen, can be correctly produced.

The carrier has two-dimensionally arrayed specimen incubation portions and separator portions provided between adjacent specimen incubation portions. The reference marks may be located at the boundary with the separator portions.

Here, the boundary between the specimen incubation portion and separator portion is used as a reference mark. Therefore, in the image processing section, the boundaries between the specimen incubation portions and separator portions are first detected, then adjacent images can be correctly composited by matching the boundaries.

The carrier is arranged in the incubator which is maintained at the predetermined incubation conditions. The image processing section may detect the boundary between the specimen incubation portions and separator portions utilizing self-fluorescence from the regions of the specimen incubation portions.

Here, the image processing section can easily detect the boundary between specimen incubation portions and separator portions by utilizing self-fluorescence from the specimen incubation portions, for example, self-fluorescence emitted by the incubation liquid in the incubator, and the adjacent images can be composited by matching the boundaries. In particular, since self-fluorescence of the incubation liquid and the like can be utilized, there is no need for a complicated constitution.

The optical device is provided with a light source, an illumination optical system that guides light emitted from the light source to the objective lens, an excitation filter, arranged between the illumination optical system and the objective lens, that transmits light of a predetermined wavelength among the light emitted from the illumination optical system, and a dichroic mirror that reflects the light transmitted by the excitation filter. It may be provided with an excitation light cut filter that cuts light of a predetermined wavelength from the returning light from the carrier, an imaging lens that images the light passing the excitation light cut filter, and an imaging element arranged in the imaging position of the imaging lens.

Here, only the light of the predetermined wavelengths is selected by transmitting the light adjusted to the predetermined illumination light by the illumination optical system through the excitation filter. The light of these wavelengths, after being reflected by the dichroic mirror, is irradiated onto the carrier by the objective lens. By transmitting the returning light from the carrier through the excitation light cut filter, light of the predetermined wavelength is certainly cut, and fluorescence emitted by the sample and light of the same wavelength as fluorescence is extracted. These light rays, after being imaged by the imaging lens, are captured by the image capturing element.

In this way, because fluorescence observation of the specimen and image capture of the reference mark using fluorescence light can be simultaneously performed, the time required for observation can be shortened. Also, there is no need for a special optical system.

The excitation filter is set to be able to simultaneously transmit excitation light of a fluorescence material in the sample and fluorescence light emitted by the fluorescence material. It may be provided with an intensity changing means for changing the intensity of the fluorescence light.

Here, excitation light from the fluorescence material of a sample and fluorescence light emitted by the fluorescence material can be reliably extracted by the excitation filter and irradiated onto the carrier by the objective lens. The fluorescence material of the sample, receiving the irradiation of this excitation light, emits fluorescence. Also, fluorescence light is used for image capture of a given mark. Thus, fluorescence observation and observation of a given mark can be simultaneously performed by image capture of fluorescence light. In particular, because the intensity of the fluorescence wavelength can be varied with the intensity changing means, it is possible to adjust the intensity of light used for image capture of a given mark to an optical intensity in contrast to the intensity of light used in fluorescence observation. Accordingly, fluorescence observation and observation of a given mark can be clearly distinguished, images can be more accurately composited to generate a single image, while more reliable fluorescence observation can be performed.

The dichroic mirror may be set so as to reflect excitation light of the fluorescence material in the sample and the fluorescence light emitted by the fluorescence material.

Here, because the dichroic mirror can reliably reflect toward the objective lens both excitation light of the fluorescence material of the sample and fluorescence light emitted by the fluorescence material that are transmitted through the excitation filter, fluorescence observation and image capture of a given mark can be reliably performed.

The reflectance Rd of the dichroic mirror for fluorescence light may be set to 1%<Rd<10%.

Here, fluorescence light transmitted through the excitation filter, after being reflected by the dichroic mirror, is irradiated onto the carrier by the objective lens and used for image capture of a given mark. In this case, because the reflectance is not less than 1%, a weakening of the reflected light intensity of a given mark is prevented with respect to the light intensity emitted by the fluorescence material. Also, because the reflectance is less than 10%, a strengthening of the reflected light intensity of a given mark is prevented with respect to the light intensity emitted by the fluorescence material. In this way, it is possible to adjust the reflected light intensity of a given mark to the optimal intensity. Accordingly, it can be accommodated within the dynamic range of the image capturing means, so fluorescence observation and image capture of a given mark can reliably be simultaneously performed.

The separator portions may be mirror coated so as to reflect light of the same wavelength as the fluorescence light emitted by the fluorescence material of the sample.

Here, because a mirror coating is applied to the separator portions, among light rays irradiated by the objective lens light of the same wavelength as the fluorescence light emitted by the fluorescence material is reflected by the separator portions. This can better clarify the intensity difference of the returning light of the separator portions and the specimen incubator, thereby enabling compositing of the images into a single image with greater accuracy.

The reflectance Re of the mirror coating may be set to 1%<Re<20%.

Here, because the reflectance Re is not less than 1%, a weakening of the reflected light intensity of a given mark is prevented with respect to the light intensity emitted by the fluorescence material. Also, because the reflectance is less than 20%, a strengthening of the reflected light intensity of a given mark is prevented with respect to the light intensity emitted by the fluorescence material. In this way, it is possible to adjust the reflected light intensity of a given mark to the optimal intensity. Accordingly, it can be accommodated within the dynamic range of the image capturing means, so fluorescence observation and image capture of a given mark can reliably be simultaneously performed.

The device has a function to capture the image of a region by scanning in one direction of the carrier and repeat successive image capture in another direction perpendicular to the first direction, and the reference mark may be provided on the carrier in the said other direction.

Here, the image capturing means treats the image scanned in one direction as one region, and so by performing successive image capture so that regions in another direction partially overlap this, image capture of a plurality of regions is performed. In this case, a given mark is arranged in the other direction, specifically, it is arranged in the overlapping portion, so the image processing section can reliably composite the scanned images.

In this way, even if the scan images are captured, the scan images are reliably composited to obtain a single image.

A dark field illumination means that emits light of an equivalent wavelength as fluorescence emitted by the sample may be provided on the reference mark.

Here, the image capturing means picks up the fluorescence in each region emitted by the sample by excitation light irradiated by the excitation light irradiation means. Also, image capture of light scattered against the sample can be simultaneously performed by the dark field illumination means. That is, since the light irradiated by the dark field illumination means is the same wavelength as fluorescence, the image capturing means can perform dark field illumination observation simultaneously with fluorescence observation.

In this way, because fluorescence observation and dark field illumination observation can be simultaneously performed, the time required for observation can be shortened. Moreover, cost can be reduced because a special optical system is not required.

The dark field illumination means may be a transmission type arranged on the opposite side of the image capturing means to sandwich the carrier.

Here, the dark field illumination means irradiates light from the opposite side of the excitation light illumination means to the carrier and transmits it through the carrier. The image capturing means can then picks up the image of the light scattered against the mark after transmission.

The dark field illumination means may be a vertical illumination type arranged on the same side as the image capturing means with respect to the carrier.

In this case, the dark field illumination means irradiates (makes incident) light onto the carrier from the same side as the excitation light illumination means. Then the image capturing means picks up the image of the light scattered against the mark after being made incident. In particular, the entire device can be made compact because the dark field illumination means, excitation light illumination means and image capturing means are all arranged on the same side.

The imaging method of the present invention is an imaging method for obtaining a captured image of a sample held on the carrier. It comprises an irradiation step that irradiates light emitted from the light source to the carrier that holds a sample and has a reference mark, an image capture step that divides the imaging region into a plurality of regions so that adjacent regions partially overlap each other and picks up an image of the sample and the reference mark in each region, and an imaging step that composites captured images of the plurality of regions so as to match the same reference mark appearing on the overlapping portion.

According to this imaging method, after illumination light is irradiated toward the carrier in the illumination step, image capture of the specimen and reference marks is performed with the image capture step by dividing the imaging region into a plurality of regions, that is, a plurality of images, so that adjacent regions partially overlap each other. In this case, a portion of the same reference mark is captured on each image captured by the image capturing means. Adjacent images can then be accurately composited by matching the same reference mark appearing on the overlapping portion of each image in the imaging step, thereby enabling a plurality of images to be correctly produced as a single image without a sense of incongruity.

What is claimed is:

1. An optical device comprising:
   a carrier for holding a specimen, the carrier being imprinted with a plurality of reference marks;
   an image capturing means for capturing an image of the specimen and the reference marks formed by an objective lens;
   a moving mechanism configured to alter the relative positional relationship between the carrier and the objective lens and dividing the imaging region into a plurality of regions so that adjacent regions partially overlap each other, thereby enabling the image of the specimen and at least one corresponding reference mark of each region to be captured by the image capturing means; and
   an image processing section that composites images of the plurality of regions captured by the image capturing means so as to match the same reference marks appearing on the overlapping portions,
   wherein the reference mark is imprinted on the carrier at a predetermined interval and each of the reference marks scatters light.

2. The optical device according to claim 1, wherein
   the carrier comprises two-dimensionally arrayed specimen incubation portions and separator portions provided between adjacent specimen incubation portions, and
   the reference marks form boundary lines with the separator portions.

3. The optical device according to claim 2, wherein
   the carrier is arranged in an incubator which is maintained at the predetermined incubation conditions, and
   the image processing section detects the boundary between the specimen incubation portions and separator portions utilizing self-fluorescence from the regions of the specimen incubation portions.

4. The optical device according to claim 3, wherein the separator portions are mirror coated so as to reflect light of the same wavelength as the fluorescence light emitted by the fluorescence material of the sample.

5. The optical device according to claim 4, wherein reflectance Re of the mirror coating is set to 1% <Re <20%.

6. The optical device according to claim 1, further comprising:
   a light source,
   an illumination optical system that guides light emitted from the light source to the objective lens, and
   an excitation filter and a dichroic mirror arranged between the illumination optical system and the objective lens, the excitation filter transmitting light of a predetermined wavelength among the light emitted from the illumination optical system and the dichroic mirror reflecting the light transmitted by the excitation filter,
   wherein the image capturing means is provided with an excitation light cut filter that cuts light of a predetermined wavelength from the returning light from the carrier, an imaging lens that focuses the light transmitted through the excitation light cut filter, and an imaging element arranged in the imaging position of the imaging lens.

7. The optical device according to claim 6, wherein the excitation filter simultaneously transmits excitation light of a fluorescence material in the sample and fluorescence light emitted by the fluorescence material.

8. The optical device according to claim 7, further comprising an intensity changing means for changing an intensity of the fluorescence light.

9. The optical device according to claim 7, wherein
   the excitation filter includes an inner part having a circular shape, and an outer part having a ring-band shape,
   the inner part is set so that transmitting the excitation light, a diameter of the inner part is set so that light passing the inner part passes an inside of an effective diameter of the objective lens, and
   the outer part is set so that transmitting light of an equivalent wavelength as the fluorescence light, an inner diameter of the outer part is set so that light passes an outside of an effective diameter of the objective lens.

10. The optical device according to claim 6, wherein the dichroic mirror is set so as to reflect excitation light of the fluorescence material in the sample and the fluorescence light emitted by the fluorescence material.

11. The optical device according to claim 10, wherein reflectance Rd of the dichroic mirror for the fluorescence light may be set to 1% <Rd <10%.

12. The optical device according to claim 6, wherein the device is provided with a dark field illumination means that emits light of an equivalent wavelength as fluorescence emitted by the sample onto the reference mark.

13. The optical device according to claim 12, wherein the dark field illumination means is a transmission type arranged on the opposite side of the image capturing means to sandwich the carrier.

14. The optical device according to claim 12, wherein the dark field illumination means is a vertical illumination type arranged on the same side as the image capturing means with respect to the carrier.

15. The optical device according to claim 1, wherein the device has a function to capture the image of a region by scanning in one direction of the carrier and repeat successive image capture in another direction perpendicular to the first direction, and the reference mark is imprinted on the carrier in the said other direction.

* * * * *